United States Patent Office 3,406,574
Patented Oct. 22, 1968

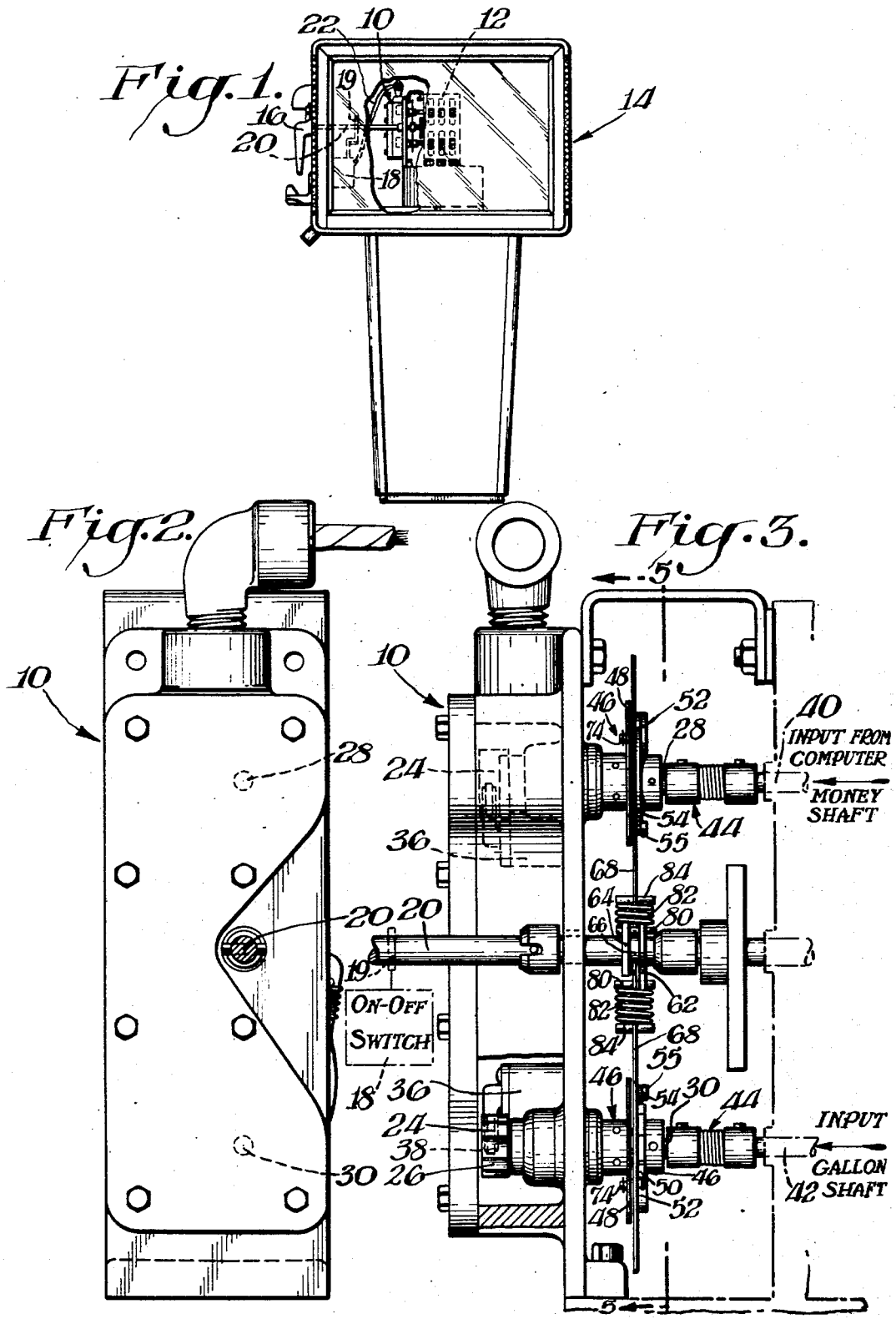

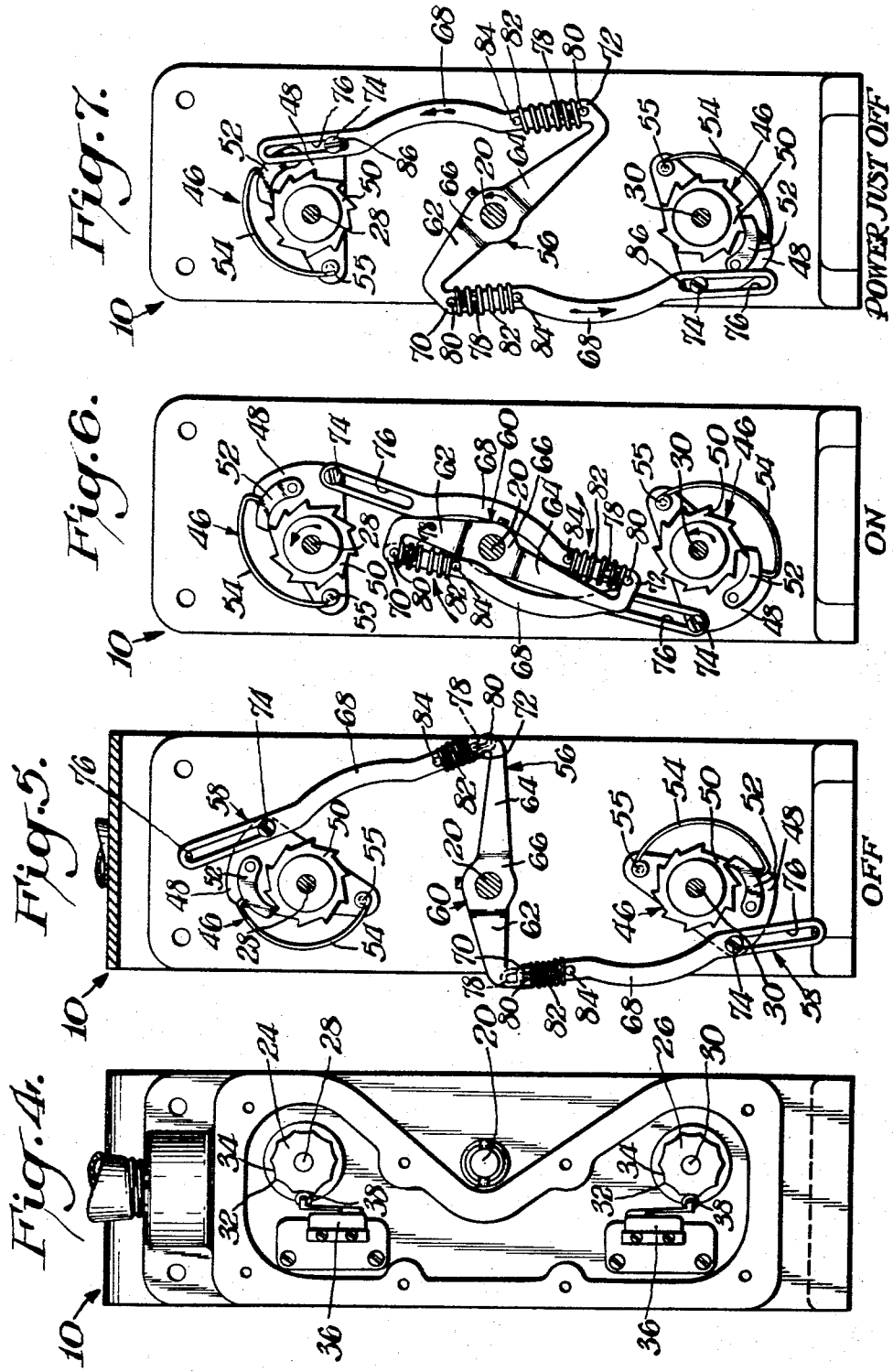

3,406,574
SHAFT ROTATION PULSING DEVICE
Roy E. Crothers and William J. Gerstenmaier, Salisbury, Md., assignors to Symington Wayne Corporation, Salisbury, Md., a corporation of Maryland
Filed July 26, 1966, Ser. No. 567,913
10 Claims. (Cl. 74—1)

ABSTRACT OF THE DISCLOSURE

Signal pulses corresponding to angular phases of a rotating shaft are generated by a ridged cam which actuates a switch. Erroneous repetition of pulses in successive cycles is prevented by connecting the camshaft to a control elements (actuating the starting and stopping of rotation of the rotating shaft) in a manner which uniformly centers or zeroes it after each cycle of rotation of the rotating shaft is completed and before it is restarted. The camshaft is accordingly connected to the rotating shaft through a first one-way overrunning drive, and the control element is connected to the camshaft through a second one-way overrunning drive by a linkage having a motion-permitting coupling. This motion-permitting coupling allows the centering or zero setting movement ahead of the cam to be accomplished after the rotating shaft is stopped and before it is restarted. This centering is conveniently accomplished during the "off" movement of the control element after the rotating shaft is stopped during the freely moving or take-up phase of the linkage.

---

This invention relates to a device for generating signal pulse corresponding to angular phases of a rotating shaft, and it more particularly relates to such a device for generating a series of signal pulses in response to rotation of the indicating shafts of a gasoline dispenser computer.

Various electrically-operated registering devices are presently operated in response to signals derived from the mechanical computers of gasoline dispensers. Such electrically-operated registers are useful in receipt printers, remote supervisory systems and inventory control systems. Cam and follower operated electrical switches are accordingly actuated from money and gallon shafts of the computer. It is possible for such switches to remain in an actuated condition if the computer shaft stops in that phase. This would generate a pulse both in the terminated dispensing cycle and in the next cycle, thus providing an erroneous total unacceptable to weights and measures regulations.

An object of this invention is to provide a device for generating electrical signal pulses in response to rotation of a shaft which cannot generate erroneous double pulses in successive cycles of operation.

Another object is to provide such a device which transmits electrical pulses in response to rotation of money and gallon shafts of a computer in a gasoline dispenser.

In accordance with this invention a device for generating signal pulses corresponding to angular phases of a rotating input shaft includes a ridged cam which actuates an electrical switch to generate pulses through a follower. Erroneous repetition of pulses in successive cycles is prevented by connecting the camshaft to a control element (actuating the starting and stopping of rotation of the input shaft to the device) in a manner which uniformly centers or zeroes it after each cycle of rotation of the input shaft is completed and before it is restarted.

The camshaft is accordingly connected to its input shaft through a first one-way overrunning drive, and the control shaft is connected to the camshaft through a second one-way overrunning drive by a linkage having a motion-permitting coupling. This motion-permitting coupling allows the centering or zero setting movement ahead of the cam to be accomplished after the dispenser is turned off and before it is restarted. This centering is conveniently accomplished during the "off" movement of the control element after the dispenser is turned off during the freely moving or take-up phase of the linkage.

Such a device for connection to a gasoline dispenser advantageously includes a pair of cams mounted upon camshafts respectively connected to the money and gallon shafts of the computer through first one-way overrunning drives. Centering linkages connect the start lever of the dispenser to second one-way overrunning drives connected to the cam shafts between the first one-way overrunning drives and the cams. These motion-permitting centering linkages conveniently include a common crank secured to a portion of the start control mechanism. This crank is connected to the second one-way overrunning pawl and ratchet drives to the camshafts through slotted links which afford free movement of the linkages until after the dispenser is turned off. Shock absorbing connections in the linkages prevents the camshafts from being bounced ahead of the one-way drives during their centering movement.

Novel features and advantages of the present invention will become apparent to one skilled in the art from a reading of the following description in conjunction with the accompanying drawings wherein similar reference characters refer to similar parts and in which:

FIG. 1 is a front view in elevation of a gasoline dispenser upon which one embodiment of this invention is mounted and connected;

FIG. 2 is an end view in elevation of the left-hand side of the embodiment shown in FIG. 1;

FIG. 3 is a front view in elevation of the embodiment shown in FIG. 1 and a portion of the dispenser to which it is connected;

FIG. 4 is an end view in elevation similar to FIG. 2 with the cover of the casing removed;

FIG. 5 is a cross-sectional end view in elevation taken through FIG. 3 along the line 5—5 in the "off" position;

FIG. 6 is a cross-sectional view similar to FIG. 5 in the "on" position; and

FIG. 7 is a cross-sectional view similar to FIGS. 5 and 6 moving toward the "off" position.

In FIG. 1 is shown a signal pulse generating device 10 mounted upon and connected to computer 12 of gasoline dispenser 14. The operation of dispenser 14 is controlled by start or control lever 16 connected to main dispenser power switch 18 through operating rod 19. A control shaft 20 connects control lever 16 to device 10 to control its operation in a manner later described. Electrical leads or wires 22 extend from device 10 through a conduit (not shown) to transmit the pulses generated by device 10.

FIGS. 2–5 illustrate the parts of device 10 in their positions when dispenser 14 and computer 12 are turned off. Device 10 includes cams 24 and 26 shown in FIG. 4 respectively mounted upon camshafts 28 and 30. Cams 24 and 26 include a series of ridges 32 separated by valleys 34 corresponding to ten angular phases of rotation. Pulsing switches 36 are connected to be actuated by cams 24 and 26 by followers 38. Followers 38 are engaged in the centers of valleys 34 in the "off" condition, shown in FIG. 4, in which switch 36 is in an unactuated or non-pulsing condition. The zero or non-pulsing condition could also be arranged to occur when follower 38 is upon a ridge 32 but the illustrated condition is more positively sought. The cams could also each include only one ridge and valley to provide a single pulse in response to each revolution.

In FIG. 3 is shown the respective connection of camshafts 28 and 30 to computer money input shaft 40 and computer gallon input shaft 42 through one-way overrunning drives 44. First one-way overrunning drives 44 cause camshafts 28 and 30 to be rotated ahead in response to rotation of the computer shafts 40 and 42 and also permit camshafts 28 and 30 to rotate freely ahead of input shafts 40 and 42 when input shafts 40 and 42 stop. These overrunning drives are any of the many available types that provide the described function.

Second one-way overrunning drives 46, shown in FIGS. 3 and 5, are connected to camshafts 28 and 30 between first overrunning drives 44 and cams 24 and 26. Second overrunning drives 46 include plates 48 rotatably mounted upon camshafts 28 and 30. Toothed ratchet wheels 50 are secured to camshafts 28 and 30. Hooked pawls 52 pivoted to plates 48 are resiliently engaged with ratchet wheels 50 by leaf springs 54 anchored by pins 55 to plates 48. Ratchet wheels 50 and pawls 52 are arranged to compel forward rotation of camshaft 28 in response to forward rotation of plates 48. They also permit rotation of camshafts 28 and 30 freely ahead of pawl and ratchet drives 46 and also free backward movement of pawl and ratchet drives 46 free of camshafts 28 and 30 as later described.

In FIG. 3 is shown the connection between control shaft 20 controlling the "on" and "off" movement of the dispenser and control element 19 connected to the main dispenser "on-off" power switch 18. Movement of control lever 16 and its connecting elements accordingly actuates the starting and stopping of dispenser 14 and its computer input money and gallon shafts 40 and 42.

In FIG. 5 is shown centering or zeroing linkage 56 connecting control shaft 20 to the second one-way overrunning drives 46 for moving camshafts 28 and 30 forward in response to stopping or "off" movement of start lever 16. Centering linkage 56 includes motion permitting coupling 58 which has sufficient free motion to cause dispenser 14 to be turned off and the motion of its computer input shafts to be terminated before linkage 56 transmits motion to move camshafts 28 and 30 ahead to their zero or centered condition as later described in detail.

Centering linkage 56 accordingly includes a crank 60 secured to control shaft 20 having a pair of arms 62 and 64 extending from hub 66 in different direction. In FIG. 5 hub 66 is depressed below the surface of arms 62 and 64 to provide sufficient clearance to permit full movement of centering linkage 56 as shown in FIG. 6.

Centering linkage 56 also includes connecting links 68 between yoked ends 70 and 72 of crank 60 and pins 74 on plates 48. Motion permitting connections 58 are provided by slots 76 in the ends of links 68 within which pins 74 slide. Pins 74 contact inner ends 86 of slots 76 during centering movement of device 10 as later described. The opposite ends of links 68 also include smaller slots 78 within which pins 80 in yokes 70 and 72 are engaged. Coil springs 82 react between pins 84 in links 68 and pins 80 in yokes 70 and 72 to provide a shock absorbing connection between links 68 and crank 60 whereby any bouncing of camshafts 28 and 30 ahead of drives 46 is prevented.

FIGS. 4 and 5 show the position of device 10 after control shaft 20 has turned dispenser 14 off and stopped rotation of input shafts 40 and 42. FIG. 4 shows followers 38 of switches 36 in a centered or zeroed condition in a valley 34 of cams 24 and 26. Switches 36 are then in a non-pulsing or open condition in preparation for uniform starting of the next cycle of operation of dispenser 14.

FIG. 6 shows the position of device 10 after it has been moved from the "off" condition shown in FIG. 5 to the "on" condition shown in FIG. 6. Control shaft 20 has been rotated through a sufficient operating angle to turn on main dispenser switch 18 through control linkage 19. This angle is for example 110° and crank 60 is shown in FIG. 6 after it has been rotated clockwise through that angle from the "off" position shown in FIG. 5. The depressed hub 66 of crank 60 permits the curved central portions of slotted links 68 to nest over it in the full "on" position shown in FIG. 6.

At the end of the rotation of centering linkage 56 shown in FIG. 6, slots 76 engage pins 74 to rotate plates 48 clockwise to permit completion of travel of linkage 56. This clockwise rotation of plates 48 is free of camshafts 28 and 30 because pawls 52 move freely over the backwardly inclined teetth of ratchet wheels 50. Ratchet wheels 50 can also move freely under pawls 52 in response to rotation of camshafts 28 and 30 when dispenser 14 is turned on. Springs 54 of one-way overrunning drives 46 are weak enough to cause pawls 52 to ride freely on ratchet wheels 50 when they rotate at normal dispensing speed thereby avoiding undue noise and wear.

FIG. 7 shows the parts of device 10 in the positions that they assume during the "off" movement of control shaft 20 at the time that dispenser switch 18 has just been turned off. Pins 74 have not as yet reached the inner ends 86 of slots 76, and the free or takeup movement of linkage 56 has therefore not as yet been completed. This insures that dispenser switch 18 is off and input shafts 40 and 42 stop rotating before linkage 56 moves camshafts 28 and 30 ahead to a uniform centered or zeroed starting condition as shown in FIG. 5. One-way drives 46 are oriented in a predetermined angular condition each time control shaft 20 is turned fully "off" and cams 24 and 26 are angularly secured to one-way drives 46 in the forward direction of movement of drives 46. This insures that cams 24 and 26 are always centered or zeroed relative to followers 38 after each time dispenser 14 is turned off and before rotation of input shafts 40 and 42 is recommenced by turning on dispenser switch 18.

Springs 82 reacting between pins 80 and 84 connecting the ends of links 68 to slotted yokes 70 and 72 of crank 60 absorb any shocks transmitted through one-way drives 46 in the centering movement from the position shown in FIG. 6 to FIG. 5 through FIG. 7. This prevents cams 24 and 26 from being bounced ahead of pawls 52 of one-way drives 46 during their centering movement.

What is claimed is:

1. A device for generating signal pulses corresponding to angular phases of a rotating input shaft, comprising a ridged cam corresponding to said angular phases, said cam being mounted upon a rotatable camshaft, an electrical switch, follower means connecting said switch to said cam for actuation thereby, a first one-way overrunning drive between said input shaft and said camshaft permitting said camshaft to be rotated by said input shaft in the forward direction and permitting said camshaft to rotate freely ahead of said input shaft, a second one-way overrunning drive connected to said camshaft between said first one-way overrunning drive and said cam, a control element for actuating the starting and stopping of rotation of said input shaft, and a centering linkage having a motion-permitting coupling connecting said control element to said second one-way overrunning drive for transmitting motion in the forward direction to said camshaft in response to movement of said control element whereby said camshaft is moved ahead of said input shaft to a centered nonpulsing position relative to said switch after said control element stops rotation of said input shaft and before said control element restarts said rotation of said input shaft.

2. A device as set forth in claim 1 wherein said second one-way overrunning drive comprises a plate rotatably mounted upon said camshaft, a toothed ratchet wheel rotatably mounted upon said drive shaft, a pawl rotatably mounted upon said plate in engagement with said toothed ratchet wheel and arranged therewith to cause rotation of said camshaft in said forward direction in response to shaft stopping movement of said control element and to permit backward movement of said plate free of said camshaft in response to input shaft starting movement of said control element.

3. A device as set forth in claim 2 wherein said control element comprises a control shaft, said centering linkage comprises a crank mounted upon said control shaft, a connecting link between an end of said crank and said plate, and the connection between said connecting link and said plate being slotted to permit movement of said control shaft and said crank free of said second one-way overrunning drive a predetermined distance sufficient to terminate movement of said input shaft before said free movement afforded by said slotted connection is completed and said forward movement of said camshaft through said second one-way overrunning drive commences.

4. A device as set forth in claim 3 wherein a resilient connection is provided between said crank and said connecting link to absorb operating shocks whereby motion of said camshaft ahead of said second one-way overrunning drive is prevented.

5. A device as set forth in claim 4 wherein said resilient connection comprises a slotted pivot and a spring reacting between said crank and said connecting link.

6. A device as set forth in claim 5 wherein said cam includes a series of ridges separated by valleys, and said switch and said cam are arranged to cause said switch to be actuated when said follower is in contact with one of said ridges and said cam to be centered in a non-pulsing condition when said follower is disposed substantially in the center of one of said valleys.

7. A device as set forth in claim 3 wherein said device includes a pair of: said input shafts, said first and second one-way overrunning drives, and said connecting links; a single operating shaft; and said crank including a pair of arms extending from opposite sides of said single operating shaft.

8. A device as set forth in claim 7 for connection to the computer of a gasoline dispenser having quantity and money indicating shafts, wherein said input shafts are respectively connected to said money and quantity indicating shafts, said dispenser including a starting shaft and said starting shaft comprising said control shaft for starting and stopping said dispenser and said computer connected thereto.

9. A device as set forth in claim 7 wherein a resilient connection is provided between said crank and said connecting links to absorb operating shocks whereby motion of said camshafts ahead of said second one-way overrunning drives is prevented.

10. A device as set forth in claim 9 wherein said resilient connection comprises a slotted pivot and a spring reacting between said crank and said connecting links.

References Cited

UNITED STATES PATENTS

| | | | |
|---|---|---|---|
| 841,179 | 1/1907 | Putnam | 192—43.1 |
| 3,319,750 | 5/1967 | Olson | 192—43.1 |

FRED C. MATTERN, JR., *Primary Examiner.*

LEONARD H. GERIN, *Assistant Examiner.*